United States Patent [19]

Springer

[11] 3,713,340

[45] Jan. 30, 1973

[54] ALTITUDE ALERTING SYSTEM

[76] Inventor: Earl W. Springer, Box 220, Failand, Ind. 46126

[22] Filed: June 18, 1971

[21] Appl. No.: 154,534

[52] U.S. Cl. .................................................. 73/384
[51] Int. Cl. ................................................ G01c 21/00
[58] Field of Search ............73/384, 386, 387, 178 R; 340/27 AT, 266, 190; 244/77 D

[56] References Cited

UNITED STATES PATENTS 2,678,178   5/1954   MacCallum ............................ 73/384
2,323,311   7/1943   Crane et al. ......................... 244/77 D Primary Examiner—Donald O. Woodiel
Attorney—Hood, Gust, Irish, Lundy & Coffey

[57] ABSTRACT

An altimeter system including a barometric sensing device, an output device including an encoder and a synchro transmitter effective to provide an electrical output corresponding to the altitude sensed by the sensing device, and a control device including a first device for registering a prescribed altitude and a second device for registering the altitude represented by the electrical output of the output device. Each of the first and second register devices includes a mechanical counter and a positioning mechanism, such as a lead screw, drivingly connected to the counter. The first register device is manually adjustable while the second register device is driven by a synchro receiver dominated by the said synchro transmitter of the output device. The positioning mechanism moves or positions portions of switches which establish desired circuit conditions, one switch providing a circuit condition effective to alert the pilot when the aircraft is not flying within a given range of the prescribed altitude and another switch establishing a circuit condition effective to reset the system after testing.

30 Claims, 7 Drawing Figures

INVENTOR
EARL W. SPRINGER
BY Hood, Gust, Irish, Lundy & Coffey
ATTORNEYS

INVENTOR
EARL W. SPRINGER
BY
Hood, Gust, Irish, Lundy & Coffey
ATTORNEYS

ALTITUDE ALERTING SYSTEM

It is an object of my present invention to provide, for use in aircraft, an altimeter system of the type which provides an electrical output corresponding to the altitude at which the aircraft is flying, means for controlling and resetting such a system and means for providing the pilot of the aircraft with an alerting signal when the aircraft is not flying at a prescribed altitude.

In my U.S. Pat. No. 3,513,708 issued May 26, 1970, I disclosed an altimeter system capable of providing an output in the form of a digital code suitable for automatic altitude transmission via the authorized air traffic control radar beacon system. The code complies with International Civil Aviation Organization (ICAO) international agreements.

My present invention is an improvement over my prior system in that my present invention includes means for alerting the pilot when the aircraft is flying above or below the prescribed altitude, as well as means for testing and resetting the system.

The altimeter system of my present invention comprises a barometric sensing device, output means including a shaft encoder and a synchro transmitter effective to provide an electrical output corresponding to the altitude sensed by the sensing device. The output means, which also includes means for driving the encoder means and the synchro transmitter, is operatively connected to the sensing device by optical tracking means including light source means and light-actuated means. Such an optical tracking means is disclosed in my said prior U.S. Pat. No. 3,513,708.

The control means of my present altimeter system includes first means for registering a prescribed altitude, for instance, the altitude prescribed by the FAA ground controller, second means for registering the altitude represented by the electrical output of the output means, and means for connecting the said second register means to the output means. The control means also includes means for providing an alerting signal when the second register means registers an altitude different by a predetermined amount from the prescribed altitude registered by the first register means, and circuit means for operatively connecting the signal means to the first and second register means. This circuit means includes first switch means for establishing a predetermined circuit condition when the said second register means registers such an altitude different from such a prescribed altitude. The control means also includes testing and resetting means including means for deactuating the means which operatively connects the output means to the barometric sensing device, means for driving the output means downwardly to a predetermined reference level and then upwardly to a point providing an electrical output corresponding to the prescribed altitude registered in the first register means, and second circuit means for operatively connecting the deactuating means and the driving means to the first and second register means. This second circuit means includes second switch means for establishing a circuit condition effective to stop the upward movement of the output means at such a point and to actuate the means for operatively connecting the output means to the sensing device.

In the illustrative embodiment, the first and second switch means are light-actuated switch means, each said switch means including a portion positioned by the first register means and another portion positioned by the second register means. One of these portions is a light source means and the other of these portions is a light-actuated device having a light-responsive surface. The first register means includes first positioning means such as a lead screw and the second register means includes second positioning means such as a lead screw. The first positioning means is manually adjustable to select the prescribed altitude and the second positioning means is driven by a synchro receiver which is dominated by the synchro transmitter in the output means. Each of the first and second switch means includes light source means connected to and positioned by one of the positioning means and a light-actuated device connected to and positioned by the other positioning means.

One advantageous feature of my system is that the encoder means is provided with contact means defining the said predetermined reference level to which the output means is driven downwardly and from which the output means is driven upwardly during the testing and resetting operation. Particularly, contacts are arranged on the discs of my encoder means to provide current flow therethrough when the encoder means is driven to a position providing an electrical output corresponding to an agreed upon reference level. The FAA has agreed that automatic encoding altimeters should have such a reference level based upon the barometric scale setting of 29.92.

When an aircraft is flying at the prescribed altitude and the pilot of the aircraft decides to test and reset the altimeter system to assure himself that the optical tracking means is properly bracketing the indicator of the altimeter and to assure himself that the encoder is providing the proper output, he can deactuate the optical tracking means and initiate a downward slue of the encoder and the synchro transmitter to the point on the encoder at which current flows through the contact means establishing the said predetermined reference level. From this point, the encoder and synchro transmitter are automatically driven upwardly to the point providing an electrical output corresponding to the prescribed altitude registered in the first register means. The upward slue is stopped by the said second switch means which is part of the circuit means providing an operative connection between the register means and the means for deactuating the optical tracking means and the driving means for the encoder and synchro transmitter. The second switch means is also effective to establish a circuit condition for stopping such upward movement of the output means and again to actuate the optical tracking means.

During the testing and resetting operation, it is necessary to prevent the output of the encoder means from being transmitted via the transponder in the aircraft to ground stations. Thus, my control system includes means for preventing the transmission of the output of the encoder means during such downward and upward movement of the output means. In the illustrative embodiment, such a prevention means is a relay which opens and closes a switch. It will be appreciated that other such switch means and even solid state switch means may be used to prevent the output of the encoder from being transmitted.

Other objects and features of my present invention will become apparent as this description progresses.

To the accomplishment of the above and related objects, my invention may be embodied in the form illustrated in the accompanying drawings, attention being called to the fact, however, that the drawings are illustrative only, and that change may be in the specific construction illustrated and described, so long as the scope of the appended claims is not violated.

Figure 1:
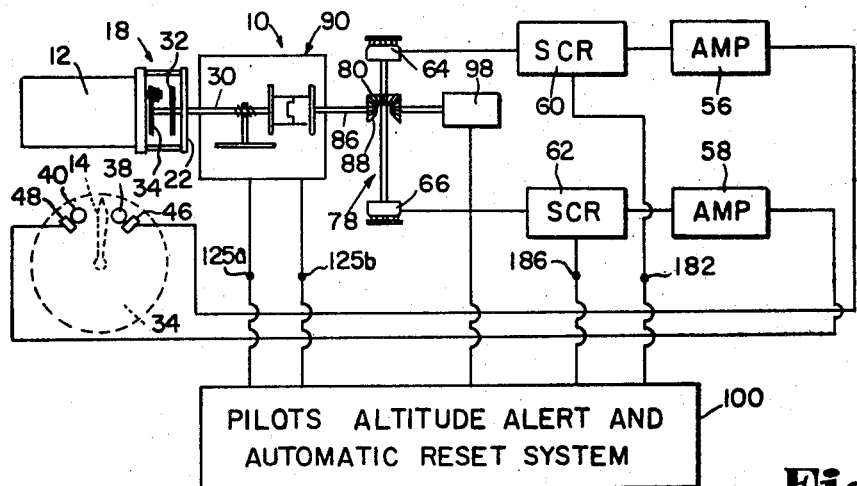
FIG. 1 is a block diagram of my preferred altimeter system comprising the pilot's altitude alert and automatic reset system.

Referring now to FIG. 1, it will be seen that I have illustrated an automatic altitude indicating and reporting system, indicated generally by the reference numeral 10. Such systems are often referred to as altitude encoders. The purpose of such systems in an aircraft is to provide an encoded (digital) output for transmission via a conventional transponder to the ground stations.

I refer to my U.S. Pat. No. 3,513,708 issued May 26,1970, which discloses an altitude encoder and particularly the altitude encoder 10. The basic system shown in FIG. 1 of the accompanying drawings corresponds to the basic unit shown in FIG. 1 of the drawings accompanying my said U.S. Pat. No. 3,513,708.

The system 10 preferably comprises a standard aircraft altimeter 12 which is equipped with an indicator or pointer 14 arranged for pivotal movement about the axis of the altimeter and means, indicated generally by the reference number 18, for tracking the movement of the indicator 14. As discussed in my said prior patent, the altimeter 12 may be a conventional altimeter which is normally found in the instrument panel of an aircraft. Such an altimeter has a glass cover plate covering and protecting the indicator 14 and the scale about which the indicator moves. My preferred tracking means 18 is arranged to track the movement of the indicator 14 by projecting and reflecting light through this cover plate.

As fully described in my said prior patent, the tracking means 18 is mounted in front of the cover plate of the altimeter to be in alignment with the pivot axis of the indicator 14. I provide a support plate 22 adjacent the front face of the altimeter, the support plate 22 providing a centrally located bearing defining a journal axis extending through the pivot axis of the indicator 14.

The tracking means 18 comprises a shaft 30 journalled in the plate 22, this shaft 30 carrying a slip-ring commutator 32 and another support plate 34.

I provide a pair of light sources 38, 40 mounted on the support plate 34 to direct light through the cover plate of the altimeter toward the path of the indicator 14. A light-responsive device 46, 48 is associated with each light source 38, 40, the light-responsive surface of each device facing the path of movement of the indicator 14.

As described in my said prior U.S. Pat. No. 3,513,708, the peripheral spacing between the light-responsive devices 46, 48 is approximately 72° because altimeters are generally calibrated so that each 36° increment of movement of the indicator 14 corresponds to an altitude increment of 100 feet. Each light-responsive device 46, 48 is arranged electrically to change state when the amount of light impinging thereon, i.e., impinging on its light-responsive surface, changes to a predetermined degree. Thus, since I project light at the path of movement of the indicator 14, when the indicator moves adjacent to one of the light-responsive devices 46, 48, the indicator will reflect light back toward the device to cause it to change state.

Any number of types of light-responsive devices will electrically change state when the amount of light impinging thereon is changed. I may use, for instance, photoresistors, the resistance of which decreases in the presence of light.

It is necessary, of course, to amplify the outputs of the devices 46, 48 so that these outputs may be used by other electrical equipment. In FIG. 1, I show the devices 46, 48 connected, respectively, to amplifier means 56, 58, each amplifier means 56, 58 being coupled to and arranged to render conductive a silicon-controlled rectifier 60, 62 which is, in turn, connected to and arranged to energize a rotary stepping motor 64, 66. These motors, 64, 66 comprise drive means for the support plate 34 on which the light sources 38, 40 and the light-responsive devices 46, 48 are mounted. In FIG. 1, as a matter of convenience, I have shown the support plate 34 in solid lines adjacent the face of the altimeter 12 and, again, in dashed lines to illustrate the position of the devices 46, 48 thereon.

In this description and in the claims, the term "amplifier means" is intended to mean a circuit or device which will accept or react to a relatively low level signal or signal change to provide a relatively high level output or an output which is effective to operate another device, such as a silicon-controlled rectifier.

As disclosed in my said prior U.S. Pat. No. 3,513,708, I prefer to use unijunction transistor oscillators as amplifier means 56, 58, such oscillators being well known and discussed, for instance, in the TRANSISTOR MANUAL published in 1964 by the General Electric Company. One of such types of circuits is shown in FIG. 13.37 on page 326 of that manual.

The device 46 changes state electrically when the indicator 14 moves adjacent thereto to cause the amplifier means 56 connected thereto to actuate the silicon-controlled rectifier 60 connected thereto to energize the associated stepping motor 64. Similarly, when the indicator 14 moves adjacent the device 48, the device 48 changes state electrically to cause the amplifier means 58 connected thereto to actuate the silicon-controlled rectifier 62 to energize its associated stepping motor 66. The motor 64 is arranged to drive the support plate 34 in a step-by-step manner in one direction about the axis of the shaft 30 and the motor 66 is arranged to drive the support plate 34 in a step-by-step manner in the opposite direction about the axis. Each motor 64, 66 is constructed and designed such that, each time it is energized, it will drive the support plate 34 an amount equal to one-half the angle for the spacing between the devices 46, 48.

In driving the support plate 34 to track or move along with the indicator 14, the motors 64, 66 also drive an encoder via shaft means 78, bevel gears 80, 88 and shaft means 86, the encoder being indicated generally by the reference numeral 90. For a description of the type of encoder I prefer to use, I refer to my said prior patent and particularly FIGS. 18 and 19 therein and the description corresponding to FIGS. 18 and 19. From this description, it will be appreciated that it is the encoder 90 which provides the pulse group series output which is fed to the transponder (not shown) and transmitted via the transponder to ground stations.

The motors 64, 66 also drive a synchro transmitter 98, the output of which is used in a manner to be described hereinafter.

For purposes of this description, assume that movement of the indicator 14 in the clockwise direction toward the device 46 constitutes an increase in altitude and that movement of the indicator 14 counterclockwise toward the device 48 constitutes a decrease in altitude.

The system described thus far corresponds to the system of my said prior U.S. Pat. No. 3,513,708, and reference is made to this prior patent for details of structure not included herein.

As indicated in my said prior patent, in order to provide the pilot of an aircraft with assurance that my system 10 is indicating and reporting the proper altitude, it is advisable to provide the pilot with a numerical indication of the output of the transponder 90. The pilot can then check this numerical indication with the reading he is obtaining from the basic altimeter which is conventionally placed in his instrument panel. In addition, for reasons which will be more fully explained hereinafter, my system is ideally suited for providing an alert when the aircraft is not flying at a prescribed altitude, i.e., an altitude prescribed by the F.A.A. controllers. Further, my system lends itself to automatic testing and resetting as a verification device for the pilot. In FIG. 1, therefore, I show a pilot's altitude alert and automatic reset system 100 which works in combination with my system 10. Generally, the system 100 receives inputs from the synchro transmitter 98 and provides inputs to the two silicon-controlled rectifiers 60, 62 and it also provides means for preventing the output of the encoder 90 from being fed to the transponder during testing and resetting of the system.

Figure 2:
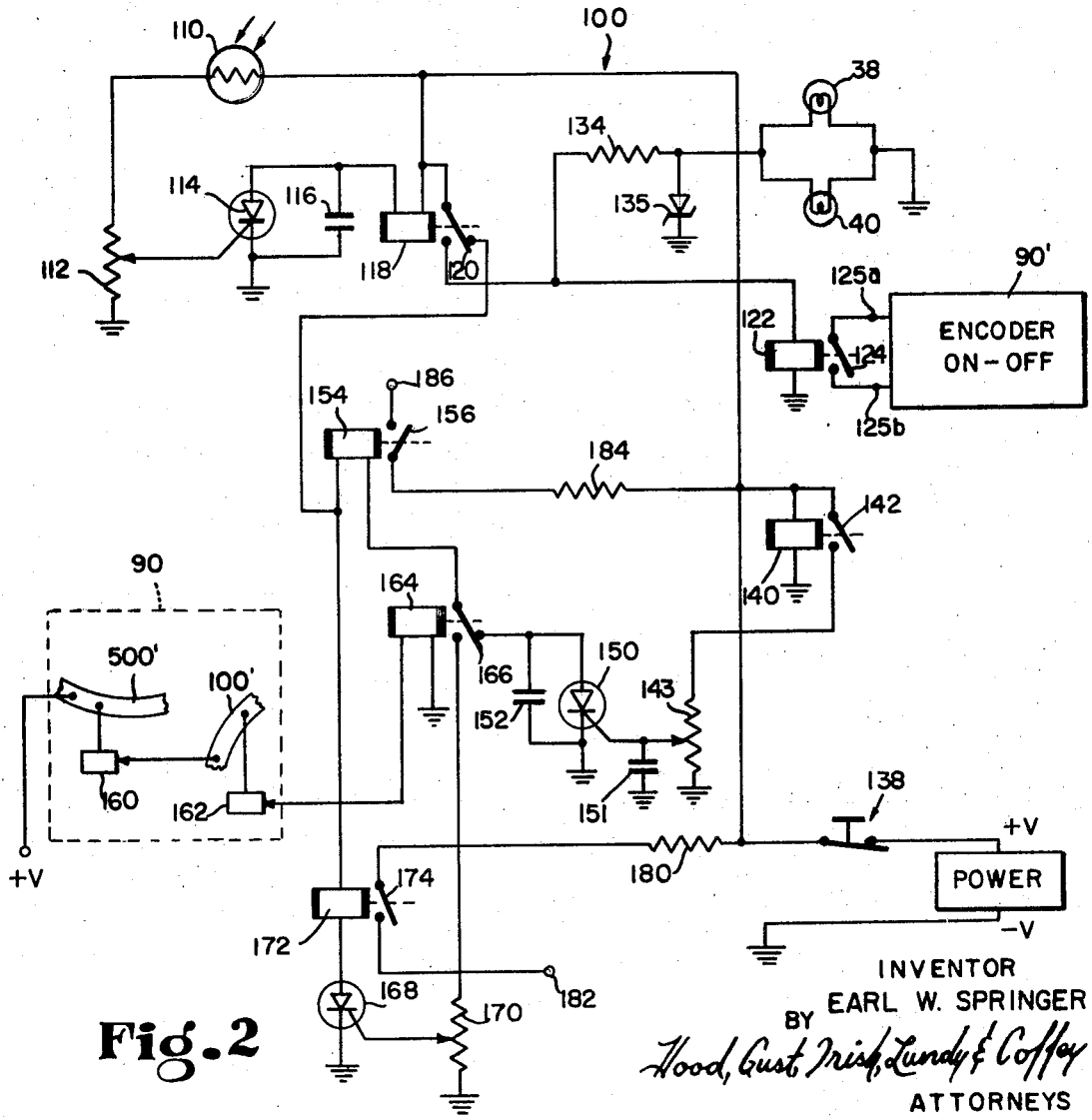
FIG. 2 is a schematic diagram of a portion of the reset system.
Figure 4:
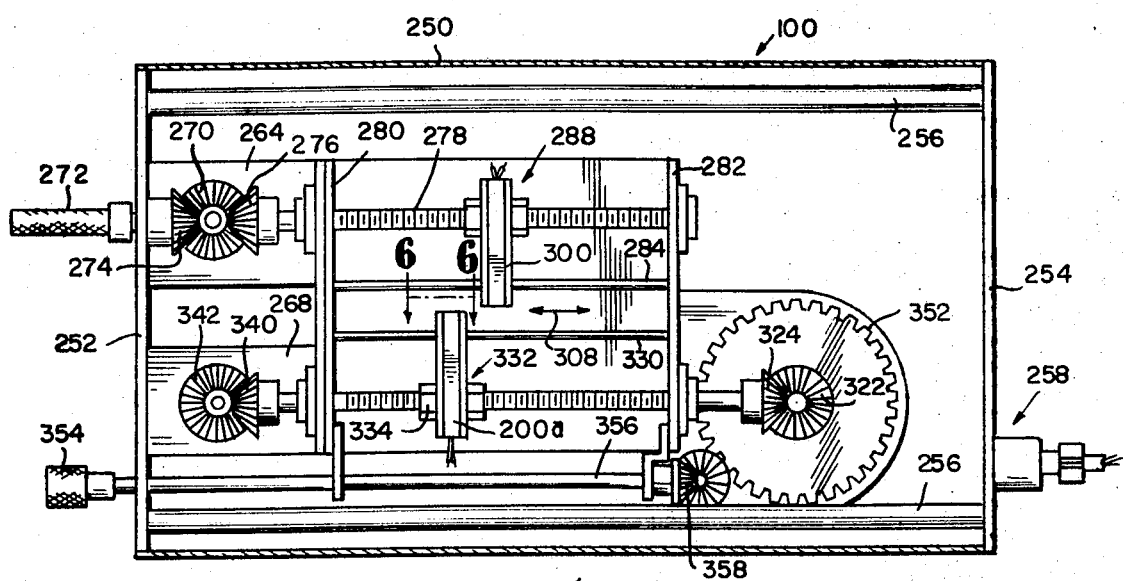
FIG. 4 is a longitudinal sectional view of the mechanism portion of my system which is mounted in the instrument panel.
Figure 5:
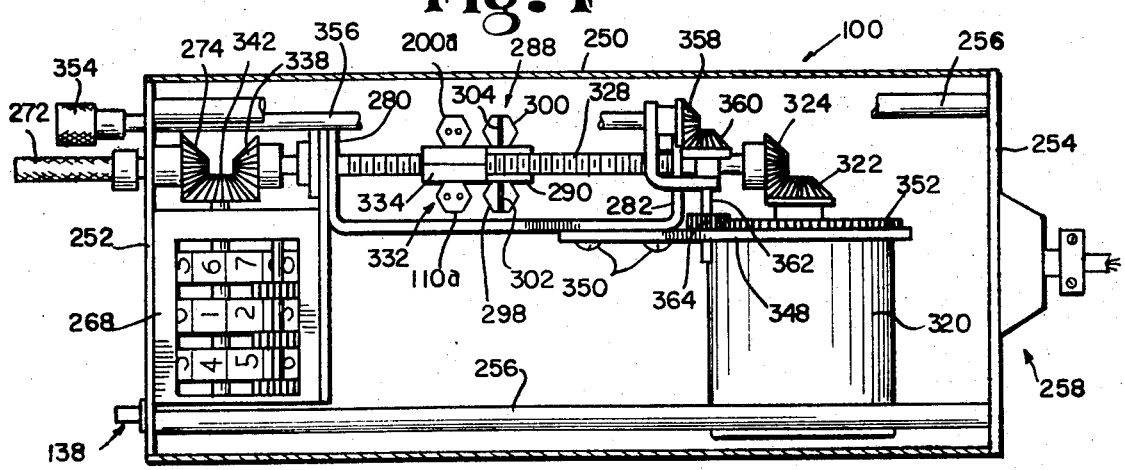
FIG. 5 is a view taken from the bottom of FIG. 4 and partially sectioned and cut away.
Figure 3:
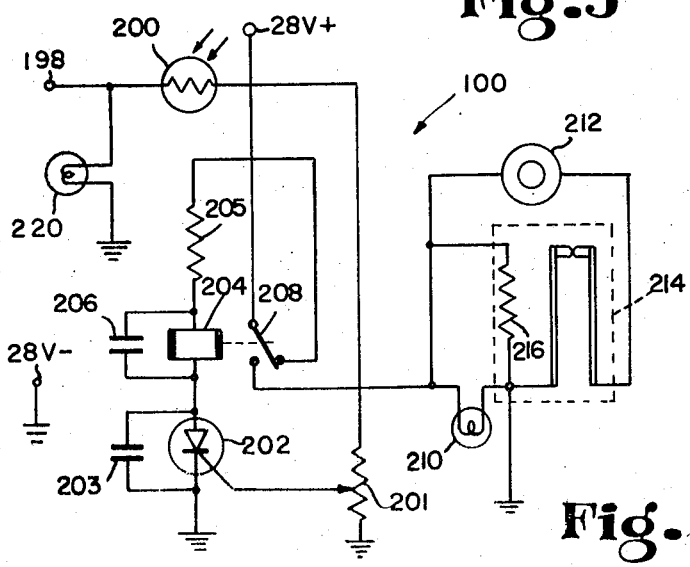
FIG. 3 is a schematic diagram of a portion of the alerting system.

A portion of the circuitry of the system 100 is shown in FIG. 2 and another portion of that circuitry is shown in FIG. 3. The mechanism associated with the circuitry of FIGS. 2 and 3 is shown in FIGS. 4, 5, 6 and 7. Turning first to the circuitry of FIG. 2, it will be seen that I have illustrated a photocell or a photoresistor 110 in series with a potentiometer 112, the wiper of which is connected to the gate electrode of a silicon-controlled rectifier (SCR) 114. There is a capacitor 116 across the anode-cathode electrode of SCR 114. The SCR 114, when turned on, operates a relay 118, to move its switch contact 120. Thus, when light is projected at the cell 110 to decrease its resistance, the relay 118 is energized to move its switch 120. The relay 118 and its switch 120 operate a relay 122 to move its switch 124. In block diagram form, I have shown an encoder on-off system indicated generally at 90', the switch 124 being connected to the system 90' through illustrated terminals 125a, 125b. The purpose of the switch 124 and the system 90' is to prevent the output of the encoder 90 from reaching the transponder during testing and resetting of the system 10. Specifically, when a pilot is flying at a prescribed altitude and sets about to test and reset the system 10, if the output of the encoder 90 is not removed from the transponder, or if the transponder is not, in some manner, prevented from transmitting the output of the encoder 90, the ground stations will be receiving spurious signals which, when decoded, will show that the craft is not flying at the prescribed altitude. As will be discussed hereinafter, the testing and resetting procedure involves driving the encoder 90 to zero and then back up to the altitude at which the craft is flying. When the relay 122 is energized and the switch 124 is closed, the output of the encoder 90 is fed to the transponder so that the transponder will transmit signals representing the altitude at which the craft is flying.

When the relay 118 is energized to move its switch 120, the lights 38, 40 on the support plate 34 are energized through a resistor 134. A zener diode 135 is connected between the resistor 134 and ground to protect the lights 38, 40. With the lights 38, 40 turned on, the tracking means 18 will be operational to follow the indicator 14 as described in my said prior patent. The lights 38, 40 are turned off during the testing and resetting operation because it is necessary to drive the support plate 34 with the encoder 90. The support plate 34 cannot be driven relative to the indicator 14 when the lights 38, 40 are on and projecting light at the path of the indicator.

The photocell 110, therefore, is the control cell. As will be discussed in conjunction with FIGS. 4-7, the photocell 110 is an operative part of a photocell switching arrangement including a light source and a photoresistor. The photocell switching arrangement is an electronic or light switching analogy of a mechanical contact arrangement.

The testing and resetting operation in initiated by opening a switch 138. Opening of this switch 138 removes current from all SCR's in the illustrated system including the SCR 114. The SCR 114 will not be conductive again until the photocell 110 is in the presence of light.

When the switch 138 closes again, current is applied to the coil of a relay 140 which is a time delay relay in that its switch 142 will open after a period of time after it is energized. During this period of time, current flows from the power source, through the switch 138 and the switch 142 and a potentiometer 143, the wiper of which is connected to the gate electrode of an SCR 150. This gate electrode is connected to ground by a capacitor 151. When the SCR 150, which has a capacitor 152 connected across its anode-cathode electrodes, is rendered conductive, current flows through the coil of a relay 154. When this occurs, the relay 154 pulls in its switch 156 to start the down slue of the system 10, i.e., to start driving the encoder 90 to zero.

If the system starts downwardly from a point above the prescribed and preset altitude which establishes the position at which the control cell 110 will see light, the down slue will continue until the control cell 110 sees light to render the SCR 114 conductive to energize the relay 118, and, consequently, the relay 122. If the system starts from a point lower than the prescribed and preset altitude, i.e., lower than the altitude represented by the position at which the photocell 110 will see light, the slue will continue downwardly to a zero point as defined by positions of zero tabs 160, 162 on the discs of the encoder 90. As discussed in my said prior U.S. Pat. No. 3,513,708, my preferred encoder includes a 500 foot disc and a 100 foot disc which are drivingly connected together and which are driven by the stepping motors 64, 66. In FIG. 2, I show zero tabs or pads 160, 162, respectively on the 500 foot disc and the 100 foot disc. Each of these discs has a slip ring arrangement as indicated such that, when the encoder 90 is in zero position, current can flow through the slip rings on both discs and the zero tabs 160, 162 to energize a relay 164. When this condition exists, the down slue is stopped. When the relay 164 is energized, it pulls in its switch 166 to apply a gate control signal to the gate of a SCR 168 through a potentiometer 170. This renders the SCR 168 conductive to energize a relay 172 having a switch 174. When the switch 174 is pulled in by the relay 172, current flows from the power source through a resistor 180 to a terminal marked 182 to initiate the up slue or the movement of the encoder 90 upwardly from its zero position. The relay 154, therefore, starts the down slue and the relay 172, therefore, starts the up slue. During the down slue, current flows from the power source through a resistor 184 and the switch 156 to a terminal indicated at 186. As viewed in FIG. 1, it will be seen that the terminal 182 is connected to the SCR 60 while the terminal 186 is connected to the SCR 62. These terminals 182, 186 are connected to the gate control electrodes of the SCR's 60, 62, respectively, to fire these SCR's. During the up slue, the SCR 60 is fired to drive the stepping motor 64 and, during the down slue, the SCR 62 is fired to drive the stepping motor 66. The resistors 180, 184 are provided to drop the current to a level suitable for introduction to the gate control electrodes of SCR's. The manner in which the stepping motors 64, 66 are advanced in a step-by-step manner by supplying signals to the gate control electrodes of their associated SCR's is discussed in my said prior patent.

In recapitulation of the description thus far, the purpose of the relay 140 is to provide a time delay period sufficient to get the down slue operation started when the switch 138 is open. During normal operation of the system 10, i.e., when the pilot is flying at the prescribed altitude and the photocell 110 is receiving light, the transponder is transmitting the digital signals provided by the encoder 90 and the tracking means 18 is tracking the indicator 14. Then, when the switch 138 is momentarily opened, power is removed from all the SCR's in FIG. 2, from the lights 38, 40, from the relay 122 and from the relay 140. The down slue is initiated, then, when the switch 138 closes to permit current flow through the switch 142 which is closed for a period of time built into the relay 140. During this period of time, current flows to the gate electrode of the SCR 150 and also through the switch 120 while it is in its illustrated position to the coil of the relay 154 and then through the switch 166 and the anode-cathode circuit of the SCR 150 to ground. When the zero position of the encoder 90 is reached, the relay 164 is energized to deenergize the relay 154 and to energize the relay 172 to move its switch 174 to start the up slue. The up slue will continue until the photocell 110 sees light to actuate the SCR 114 to energize the relay 118. The positioning of the cell 110 or the switching arrangement including the cell 110 to establish a prescribed altitude will be discussed in conjunction with FIGS. 4–7.

Turning now to FIG. 3, the alerting portion of the system 100 will be discussed. I show a terminal 198 which may be connected to a proper zener diode regulated source. This voltage source is applied to a lamp 220 which is used in conjunction with a photocell 200 which may be a photoresistor such that, when it sees light, its resistance decreases to permit sufficient current to flow through a potentiometer 201, the wiper of which is connected to the gate electrode of a silicon-controlled rectifier 202. A capacitor 203 is connected across the anode-cathode electrodes of the SCR 202. When the SCR 202 is rendered conductive by current flow through the cell 200, a relay 204 in series with the SCR 202 is energized through a resistor 205 and a switch 208 which is operated by relay 204. A capacitor 206 is connected across the coil of the relay 204 as illustrated. The resistor 205 and capacitor 206 provide a particular time constant for the operation of the relay 204. Since the switch 208 is operated by energization and deenergization of the relay 204, the time period determined by the resistor 205 and capacitor 206 determines the frequency at which the switch 208 opens and closes. When the relay 204 is energized to move the switch 208 to the left (from its illustrated solid-line position), current can flow from the power source to a light 210, an audio alarm 212, and a thermal time delay relay 214 including a heater resistor 216. The audio alarm 212 I prefer to use is referred to as a SONALERT noisemaker manufactured and sold by the P. R. Mallory Company, Indianapolis, Indiana. After a period of time during which the audio alarm 212 is energized, the contacts of the relay 214 open to disable the audio alarm 212.

As long as the cell 200 is seeing light, there is a potential on the gate of the SCR 202 sufficient to render that SCR conductive and to energize the relay 204 to cause operation of the lamp 210. The audio alarm 212 is disabled after a period of time so as not to be a bother to the pilot. The manner in which the cell 200 is exposed to light to provide an alert when the aircraft is above or below a prescribed and preset altitude will be discussed hereinafter.

Turning now to FIGS. 4–7, the manner in which the photocells 110, 200 are utilized will be discussed. My system includes a housing 250 having a front end wall 252 and a rear end wall 254 joined together by suitable structural members such as indicated at 256. The housing 250 is proportioned and designed to be inserted into a suitable opening in the instrument panel of an aircraft with the front end wall 252 visible to the pilot of the aircraft. I show a conventional electrical plug-in type connector 258 on the end wall 254 for providing electrical connection between the system and the housing 250 and the rest of the system as shown in FIG. 1.

Mounted on the inside of the front end wall 252 are two numerical counters 264, 268 of conventional type. The front end wall is provided with horizontally extending apertures (not shown) through which the numerical display drums of these counters 264, 268 are viewed. Each of these counters 264, 268 is bidirectional and can be driven mechanically to display, through its associated aperture in the front end wall 252, a number corresponding to an altitude.

The upper counter 264 has a bevel gear 270 input which is manually driven by means of a knob 272 extending outwardly from the front end wall and a bevel gear 274 movable with the knob 272 and engaging the bevel gear 270. A pilot may register the altitude prescribed in the counter 264 by turning the knob 272 either clockwise or counterclockwise until the number corresponding to the prescribed altitude appears in the aperture associated with the counter. This manual adjustment of the counter 264 also results in the driving of a bevel gear 276 which is on the forward end (left-hand end FIG. 4) of a lead screw 278 extending between a pair of flanges 280, 282 and journalled therein. A guide rod 284, which is parallel to the lead screw 278, extends between the flanges 280, 282 for a purpose which will be discussed hereinafter. The manner in which the bracket providing the flanges 280, 282 is mounted in the housing 250 is not critical and is not shown or described herein.

A pair of light sources 288 are mounted on a carriage 290 engaged with the lead screw 278 to be movable axially therealong when the lead screw is rotated. Extending downwardly from this carriage 290 is a pair of fingers 292, 294 which engage opposite sides of the guide rod 284 to prevent rotation of the carriage 290 about the axis of the lead screw 278. The engagement of the fingers 292, 294 with the guide rod 284 also tends to stabilize mechanically the light sources 288.

The pair of light sources 288 includes a light source 298 having a lamp (not shown) therein for producing light for projection at the photocell 110 and a light source 300 including the lamp 220 (FIG. 3) for producing light for projection at the photocell 200. As viewed in FIG. 5, each of these light sources 298, 300 is formed to provide laterally extending, longitudinally narrow slits 302, 304.

Thus, as the counter 264 is adjusted to register a prescribed altitude in its associated aperture in the front end wall 252, the carriage 290 is moved as indicated by arrow 308 and positioned on the lead screw 278 to provide two longitudinally narrow, laterally extending curtains of light at a position along the axis of the lead screw 278 corresponding to the altitude registered by the counter 264.

The synchro transmitter 98 (FIG. 1) is operatively connected to a synchro receiver 320 disposed in the housing 250 and having an output bevel gear 322. This bevel gear 322 is engaged with another bevel gear 324 on the rearward end of another lead screw 328 extending between the flanges 280, 282 and journal mounted therein. The lead screw 328 is below and parallel with the lead screw 278 and its guide rod 284. Above the lead screw 328 is another guide rod 330 extending between the flanges 280, 282, this guide rod being parallel with the other guide rod 284.

A pair of photocells 332 are mounted on a carriage 334 threadedly engaged with the lead screw 328 for movement axially therealong when the lead screw is rotated. Extending upwardly from the carriage 334 is a pair of fingers 336, 338 engaging opposite sides of the guide rod 330 to prevent rotation of the carriage 334 about the axis of the lead screw and also to stabilize mechanically the pair of photocells 332.

On the forward end of the lead screw 328 is a bevel gear 340 which is in meshing engagement with a bevel gear 342 which is the input drive for the lower counter 268. Thus, movement of the lead screw 328 by the synchro receiver 320 positions the pair of photocells 332 and it also registers the altitude at which the aircraft is flying in the counter 268. Specifically, as discussed in my said prior U.S. Pat. No. 3,513,708, the synchro transmitter 98 which is driven along with the encoder 90 and the support plate 34 provides an electrical output which drives the synchro receiver 320 to follow the transmitter 98. The manner in which a synchro receiver follows a synchro transmitter is well known and need not be discussed in detail in this description. One possible electrical connection between a synchro transmitter and a synchro receiver is disclosed in my said prior patent.

The counter 268, therefore, displays numerically the altitude at which the aircraft is flying, the altitude corresponding to the position of the indicator 14 in the altimeter 12 and corresponding to the digital code being provided by the encoder 90. The position of the pair of photocells 332, therefore, corresponds to the altitude at which the craft is flying.

The synchro receiver 320 is carried by a bracket 348 such that the stator housing of the synchro receiver is rotatably adjustable about its axis, the bracket 348 being fastened to the bracket providing the flanges 280, 282 by means such as the illustrated screws 350. On the face of the synchro receiver is a gear 352. The position of the stator windings of the synchro receiver 320 is adjusted by adjusting a knob 354 extending outwardly from the front end wall 252 and carried on a shaft 356. On the rearward end of this shaft 356 is a bevel gear 358 which is in meshing engagement with another bevel gear 360. The bevel gear 360 is mounted on a shaft 362 on which is mounted a pinion gear 364 in meshing engagement with the gear 352. Thus, rotation of the knob 354 adjusts the position of the stator windings of the synchro receiver 320. The reason for adjusting the synchro receiver via the knob 354 is to compensate for changes in barometric pressure in order to achieve readout agreement between the pilot's altimeter in the instrument panel and the altitude reading showing in the counter 268.

In the illustrated embodiment, the pair of photocells 332 includes a pair of vertically elongated tubes 110a, 200a, each of which contains, at its bottom end, its associated photoresistor 110, 200.

Figure 6:
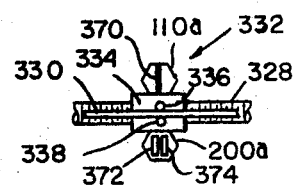
FIG. 6 is a fragmentary sectional view taken along the lines 6—6 in FIG. 4.
Figure 7:
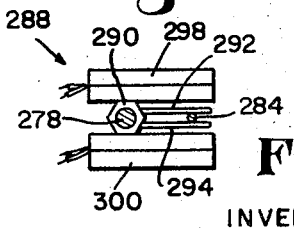
FIG. 7 is a fragmentary sectional view of the light source means for the two light-actuated switch means.

Referring to FIG. 6, it will be seen that the upper end of the tube 110a is covered by means providing a laterally extending, longitudinally narrow slit 370 while the upper end of the tube 200a is covered by means providing a pair of laterally extending, longitudinally narrow slits 372, 374. The light projected through the slit 304 in the light source 300 is projected vertically downwardly toward the path of the two slits 372, 374. The light shining through the slit 302 in the light source 298 is projected vertically downwardly toward the path of the slit 370.

When the aircraft is flying at the prescribed and preset altitude, i.e., the altitude set in the counter 264 and corresponding to the position of the pair of light sources 288, the light produced by the light source 300 and projected through the slit 304 impinges on the web between the two slits 372, 374 and the light produced by the light source 298 and projected through the slit 302 is projected through the slit 370 to impinge upon the photocell 110 (FIG. 2), thereby to render the SCR 114 conductive to keep the relay 118 energized which, in turn, keeps the relay 122 energized and the lights 38, 40 ignited. The SCR 114 will stay conductive as long as there is a potential on its anode electrode. It will be appreciated that that potential will remain there until the switch 138 is opened, at which time the relay 118 will be deenergized.

Thus, when the aircraft climbs above its prescribed and preset altitude or descends below that altitude, the carriage 334 will be driven by the synchro receiver 320 such that the light which was impinging upon the web between the slits 372, 374 will project through one of these slits to impinge upon the photocell 200 to start the alert system discussed in conjunction with FIG. 3. The slits 372, 374 may be proportioned and designed and positioned such that the alerting system will be energized, for instance, at points 300 feet below and 300 feet above the prescribed altitude. Once the carriage 334 starts to move, the slit 370 will move away from the slit 302 so that the photocell 110 will not be seeing light. However, the SCR 114 will remain conductive as discussed previously once it is turned on by the photocell 110.

Assuming that the aircraft is flying at the prescribed altitude preset into the counter 264 and corresponding to the position of the light sources 288 and that the pilot of the aircraft desires to test and reset the system simply to verify its operation. This is accomplished automatically by opening momentarily the switch 138 to start the down slue, the opening of the switch 138 being effective to render the SCR 114 nonconductive to drop out the relay 118 to turn off the lights 38, 40. The down slue will continue until the encoder 90 reaches its zero position, at which time current can flow through the zero tabs 160, 162 to the relay 164 to start the up slue. The up slue will continue until the photocell 110 sees light, i.e., until the slit 370 is in vertical registry with the slit 302 of the light source 298. Once the light shines through the slit 370 and onto the photocell 110, the lights 38, 40 will be ignited to cause the tracking means 18 to lock onto the indicator 14. During this down slue and subsequent up slue, the counter 268 will be driven by the synchro transmitter 320 downwardly and then upwardly. If the aircraft is maintained at the altitude set into the counter 264, at the end of the up slue, the counter 268 will read the same as the counter 264.

It will be appreciated that, if an aircraft is flying below the prescribed and preset altitude when the switch 138 is momentarily opened and closed, the system will down slue to zero as represented by current flow through the zero tabs 160, 162 and then slue upwardly. The upward slue will continue until the photocell 110 sees light. If the aircraft is still below the prescribed and preset altitude, the tracking means 18 will be actuated by igniting the lights 38, 40 at a point which may be away from the indicator 14, i.e., at the point where the cell 110 sees light. Then, as the aircraft climbs or descends, the pointer 14 will finally catch up with the devices 46, 48 to be bracketed thereby. This condition will result in the transmission of altitude code not corresponding to the prescribed and preset altitude and not necessarily corresponding to the altitude at which the aircraft is flying. The ground stations will pick this up and notify the pilot that he is not transmitting proper altitude signals.

What is claimed is:

1. An altimeter system comprising a barometric sensing device, output means effective to provide an electrical output corresponding to the altitude sensed by said device, means for operatively connecting said output means to said sensing device, and control means including first means for registering a prescribed altitude, second means for registering the altitude represented by the electrical output of said output means, means for connecting said second register means to said output means, means for providing an alerting signal when said second register means registers an altitude different by a predetermined amount from the prescribed altitude registered by said first register means, and circuit means for operatively connecting said signal means to said first and second register means, said circuit means including first switch means for establishing a predetermined circuit condition when said second register means register such an altitude different from such a prescribed altitude, said output means including encoder means and said control means including means for testing and resetting said system, said testing and resetting means including means for deactuating said means for operatively connecting said output means to said sensing device, means for driving said output means downwardly to a predetermined reference level and then upwardly to a point providing an electrical output corresponding to the said prescribed altitude registered in said first register means, and second circuit means for operatively connecting said deactuating means and said driving means to said first and second register means, said second circuit means including second switch means for establishing a circuit condition effective to stop said upward movement of said output means at such a point and to actuate said means for operatively connecting said output means to said sensing device.

2. The system of claim 1 in which said encoder means includes contact means for defining said predetermined reference level, said contact means being effective to operate said second circuit means to stop such downward movement of said output means and to start such upward movement of said output means.

3. The system of claim 1 in which said second circuit means includes means for preventing the transmission of the output of said encoder means during such downward and upward movement of said output means.

4. An altimeter system comprising a barometric sensing device, output means effective to provide an electrical output corresponding to the altitude sensed by said device, means for operatively connecting said output means to said sensing device, and control means including first means for registering a prescribed altitude, second means for registering the altitude represented by the electrical output of said output means, means for connecting said second register means to said output means, means for providing an alerting signal when said second register means registers an altitude different by a predetermined amount from the prescribed altitude registered by said first register means, and circuit means for operatively connecting said signal means to said first and second register means, said circuit means including first switch means for establishing a predetermined circuit condition when said second register means registers such an altitude different from such a prescribed altitude, said output means including encoder means and means for driving said encoder means, said means for operatively connecting said output means to said sensing device including optical means for tracking said sensing device, said optical means including light source means and light-actuated means, and said control means including means for testing and resetting the system, said testing and resetting means including means for deactuating said tracking means, means for energizing said driving means to drive said output means downwardly to a predetermined reference level and then upwardly to a position providing an electrical output corresponding to the said prescribed altitude registered in said first register means, and second circuit means for operatively connecting said deactuating means and energizing means to said first and second register means, said second circuit means including second switch means for establishing a circuit condition effective to stop said upward movement of said output means at such a point and to actuate said tracking means.

5. The system of claim 4 in which said encoder means includes contact means positioned and arranged to define said predetermined reference level, said contact means being positioned and arranged to conduct current therethrough when said encoder is driven downwardly to said predetermined level, said second circuit means being responsive to such current to stop such downward movement of said output means and to start such upward movement of said output means.

6. The system of claim 4 in which said second circuit means includes means for preventing the transmission of the output of said encoder means during such downward and upward movement of said output means.

7. The system of claim 4 in which said means for deactuating said tracking means includes means for deenergizing said light source means, said second switch means being effective, when operated, to energize said light source means.

8. An altimeter system comprising a barometric sensing device, output means effective to provide an electrical output corresponding to the altitude sensed by said device, means for operatively connecting said output means to said sensing device, and control means including first means for registering a prescribed altitude, second means for registering the altitude represented by the electrical output of said output means, means for connecting said second register means to said output means, means for providing an alerting signal when said second register means registers an altitude different by a predetermined amount from the prescribed altitude registered by said first register means, and circuit means for operatively connecting said signal means to said first and second register means, said circuit means including first switch means for establishing a predetermined circuit condition when said second register means registers such an altitude different from such a prescribed altitude, said first register means including a counter and cooperating positioning means, and means for adjusting said counter and positioning means to register such a prescribed altitude, said first switch means including a portion operatively connected to and positioned by said positioning means and a cooperating portion, and said second register means including a second counter and cooperating second positioning means, said cooperating portion of said first switch means being operatively connected to and positioned by said second positioning means.

9. An altimeter system comprising a barometric sensing device, output means effective to provide an electrical output corresponding to the altitude sensed by said device, means for operatively connecting said output means to said sensing device, and control means including first means for registering a prescribed altitude, second means for registering the altitude represented by the electrical output of said output means, means for connecting said second register means to said output means, means for providing an alerting signal when said second register means registers an altitude different by a predetermined amount from the prescribed altitude registered by said first register means, and circuit means for operatively connecting said signal means to said first and second register means, said circuit means including first switch means for establishing a predetermined circuit condition when said second register means registers such an altitude different from such a prescribed altitude, said first register means including positioning means and means for adjusting said positioning means to register such a prescribed altitude, said second register means including second positioning means, and said first switch means including a portion operatively connected to and positioned by each of said positioning means.

10. An altimeter system comprising a barometric sensing device, output means effective to provide an electrical output corresponding to the altitude sensed by said device, means for operatively connecting said output means to said sensing device, and control means including first means for registering a prescribed altitude, second means for registering the altitude represented by the electrical output of said output means, means for connecting said second register means to said output means, means for providing an alerting signal when said second register means registers an altitude different by a predetermined amount from the prescribed altitude registered by said first register means, and circuit means for operatively connecting said signal means to said first and second register means, said circuit means including first switch means for establishing a predetermined circuit condition when said second register means registers such an altitude different from such a prescribed altitude, said output means including a synchro transmitter, said first register means including positioning means and means for adjusting said positioning means to register such a prescribed altitude, said second register means including a synchro receiver dominated by said synchro transmitter and second positioning means drivingly connected to said synchro receiver, and said first switch means including a portion operatively connected to and positioned by each of said positioning means.

11. The system of claim 10 in which one portion of said first switch means includes a light source means and the other portion includes a cooperating light-actuated device having a light responsive surface.

12. The system of claim 11 in which each of said positioning means includes a lead screw, said lead screws being parallel, said portions of said first switch means being longitudinally movable, respectively, along said lead screws, said light source means including slit means providing a longitudinally narrow, laterally extending curtain of light, said light actuated device including means providing a pair of longitudinally spaced apart, laterally extending and longitudinally narrow slits and a web therebetween, said slits and web being disposed between said light source means and said light responsive surface, said light source means being arranged to project said curtain of light toward the path of movement of said pair of narrow slits, said light source means and said light actuated device being proportioned and designed such that, when the altitude registered by said second register means is equal to the altitude registered by said first register means, the curtain of light will impinge on said web and not be projected through either slit.

13. The system of claim 12 in which said first register means includes a bidirectional mechanical counter drivingly connected to said first mentioned positioning means to display numerically the prescribed altitude and said second register means includes a second bidirectional mechanical counter drivingly connected to said second positioning means to display the altitude corresponding to the said electrical output.

14. The system of claim 10 in which said first register means includes a display counter drivingly connected to said first mentioned positioning means to display numerically the prescribed altitude and said second register means includes a second display counter drivingly connected to said second positioning means to display numerically the altitude corresponding to the said electrical output.

15. An altimeter system comprising a barometric sensing device, output means effective to provide an electrical output corresponding to the altitude sensed by said device, means for operatively connecting said output means to said sensing device, and control means including first means for registering a prescribed altitude, second means for registering the altitude represented by the electrical output of said output means, means for connecting said second register means to said output means, means for providing an alerting signal when said second register means registers an altitude different by a predetermined amount from the prescribed altitude registered by said first register means, and circuit means for operatively connecting said signal means to said first and second register means, said circuit means including first switch means for establishing a predetermined circuit condition when said second register means registers such an altitude different from such a prescribed altitude, said output means including encoder means, a synchro transmitter, and means for driving said encoder means and synchro transmitter, said means for operatively connecting said output means to said sensing device including optical means for tracking said sensing device, said optical means including light source means and light-actuated means, and said control means including means for testing and resetting the system, said testing and resetting means including means for deactuating said tracking means, means for energizing said driving means to drive said output means downwardly to a predetermined reference level and then upwardly to a position providing an electrical output corresponding to the said prescribed altitude registered in said first register means, and second circuit means for operatively connecting said deactuating means and energizing means to said first and second register means, said second circuit means including second switch means for establishing a circuit condition effective to stop said upward movement of said output means at such a point and to actuate said tracking means.

16. The system of claim 15 in which said first register means includes positioning means and means for adjusting said positioning means to register such a prescribed altitude, said second register means includes a synchro receiver dominated by said synchro transmitter and second positioning means drivingly connected to said synchro receiver, and said first switch means includes a portion operatively connected to and positioned by each of said positioning means.

17. The system of claim 16 in which one portion of said first switch means includes a light source means and the other portion includes a cooperating light-actuated device having a light responsive surface.

18. The system of claim 17 in which each of said positioning means includes a lead screw, said lead screws being parallel, said portions of said first switch means being longitudinally movable, respectively, along said lead screws, said light source means including slit means providing a longitudinally narrow, laterally extending curtain of light, said light actuated device including means providing a pair of longitudinally spaced apart, laterally extending and longitudinally narrow slits and a web therebetween, said slits and web being disposed between said light source means and said light responsive surface, said light source means being arranged to project said curtain of light toward the path of movement of said pair of narrow slits, said light source means and said light actuated device being proportioned and designed such that, when the altitude registered by said second register means is equal to the altitude registered by said first register means, the curtain of light will impinge on said web and not be projected through either slit.

19. The system of claim 16 in which said second switch means includes a portion operatively connected to and positioned by each of said positioning means.

20. The system of claim 19 in which one portion of said second switch means includes a light source means and the other portion includes a cooperating light-actuated device having a light responsive surface.

21. The system of claim 20 in which each of said positioning means includes a lead screw, said lead screws being parallel, said portions of said second switch means being longitudinally movable, respectively, along said lead screws, said light source means of said second switch means including slit means providing a longitudinally narrow laterally extending curtain of light, said light actuated device of said second switch means including means providing a laterally extending and longitudinally narrow slit disposed between said light source means and said light responsive surface, said light source means being arranged to project said curtain of light toward the path of movement of said slit.

22. The system of claim 15 in which said encoder means includes contact means positioned and arranged to define said predetermined reference level, said contact means being positioned and arranged to conduct current therethrough when said encoder is driven downwardly to said predetermined level, said second circuit means being responsive to such current to stop such downward movement of said output means and to start such upward movement of said output means.

23. The system of claim 15 in which said second circuit means includes means for preventing the transmission of the output of said encoder means during such downward and upward movement of said output means.

24. The system of claim 15 in which said means for deactuating said tracking means includes means for deenergizing said light source means, said second switch means being effective, when operated, to energize said light source means.

25. An altimeter system comprising a barometric sensing device, output means effective to provide an electrical output corresponding to the altitude sensed by said device, means for operatively connecting said output means to said sensing device, said output means including encoder means and means for driving said encoder means, said means for operatively connecting said output means to said sensing device including optical means for tracking said sensing device, said optical means including light-actuated means and light source means, and control means including first means for registering a prescribed altitude, second means for registering the altitude represented by the electrical output of said output means, means for connecting said second register means to said output means, and testing and resetting means including means for deactuating said tracking means, means for energizing said driving means to drive said output means downwardly to a predetermined reference level and then upwardly to a position providing an electrical output corresponding to the said prescribed altitude registered in said first register means, and circuit means for operatively connecting said deactuating means and energizing means to said first and second register means, said circuit means including switch means for establishing a circuit condition effective to stop said upward movement of said output means at such a point and to actuate said tracking means.

26. The system of claim 25 in which said output means includes a synchro transmitter, said first register means includes positioning means and means for adjusting said positioning means to register such a prescribed altitude, said second register means includes a synchro receiver dominated by said synchro transmitter and second positioning means drivingly connected to said synchro receiver, and said switch means includes a portion operatively connected to and positioned by each of said positioning means.

27. The system of claim 26 in which said first register means includes a bidirectional mechanical counter drivingly connected to said first mentioned positioning means to display numerically the prescribed altitude and said second register means includes a second bidirectional mechanical counter drivingly connected to said second positioning means to display the altitude corresponding to the said electrical output.

28. The system of claim 25 in which said encoder means includes contact means for defining said predetermined reference level, said contact means being effective to operate said circuit means to stop such downward movement and to start such upward movement.

29. The system of claim 25 in which said circuit means includes means for preventing the transmission of the output of said encoder means during such downward and upward movement.

30. The system of claim 25 in which said means for deactuating said tracking means includes means for deenergizing said light source means, said switch means being effective, when operated, to energize said light source means.

* * * * *